(12) United States Patent
Röhm

(10) Patent No.: US 6,397,712 B1
(45) Date of Patent: Jun. 4, 2002

(54) LATHE CHUCK WITH JAW-POSITION MONITOR

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 26 days.

(21) Appl. No.: 09/598,099

(22) Filed: Jun. 21, 2000

(30) Foreign Application Priority Data

Jul. 3, 1999 (DE) .......................... 199 30 784

(51) Int. Cl.$^7$ .......................... B23B 5/22; B23B 31/02
(52) U.S. Cl. .......................... 82/165; 82/170; 279/110
(58) Field of Search .......................... 82/165, 162, 170; 279/110, 111, 112, 113, 114, 123

(56) References Cited

U.S. PATENT DOCUMENTS

| | | | | |
|---|---|---|---|---|
| 3,765,691 A | * | 10/1973 | Saruhashi | 279/71 |
| 3,814,448 A | * | 6/1974 | Buck | 279/4.12 |
| 4,270,763 A | * | 6/1981 | Rohm | 279/123 |
| 4,690,416 A | * | 9/1987 | Rohm | 279/110 |
| 4,872,691 A | * | 10/1989 | Rohm | 279/123 |
| 4,877,259 A | * | 10/1989 | Rohm | 279/123 |

* cited by examiner

Primary Examiner—Henry Tsai
(74) Attorney, Agent, or Firm—Herbert Dubno; Andrew Wilford

(57) ABSTRACT

A lathe chuck has a rotatable chuck body formed with jaw guides and with respective secantally extending rack guides crossing the jaw guides. Jaws are radially displaceable in the jaw guides between radial inner and outer end positions and have axially backwardly directed jaw teeth. Racks are secantally displaceable in the rack guides, and respective bolts in the racks each have teeth meshable with the respective jaw teeth and are each displaceable between a forward meshing position and a rear out-of-mesh position. A slide assembly in the body has respective cam surfaces engageable with the bolts and is displaceable angularly between a holding position retaining the bolts in the meshing position and a freeing position allowing the bolts to move into the out-of-mesh positions. Pins displaceable on the bolts have outer ends engageable with the respective jaws in both the meshing and out-of-mesh positions of the bolts.

12 Claims, 12 Drawing Sheets

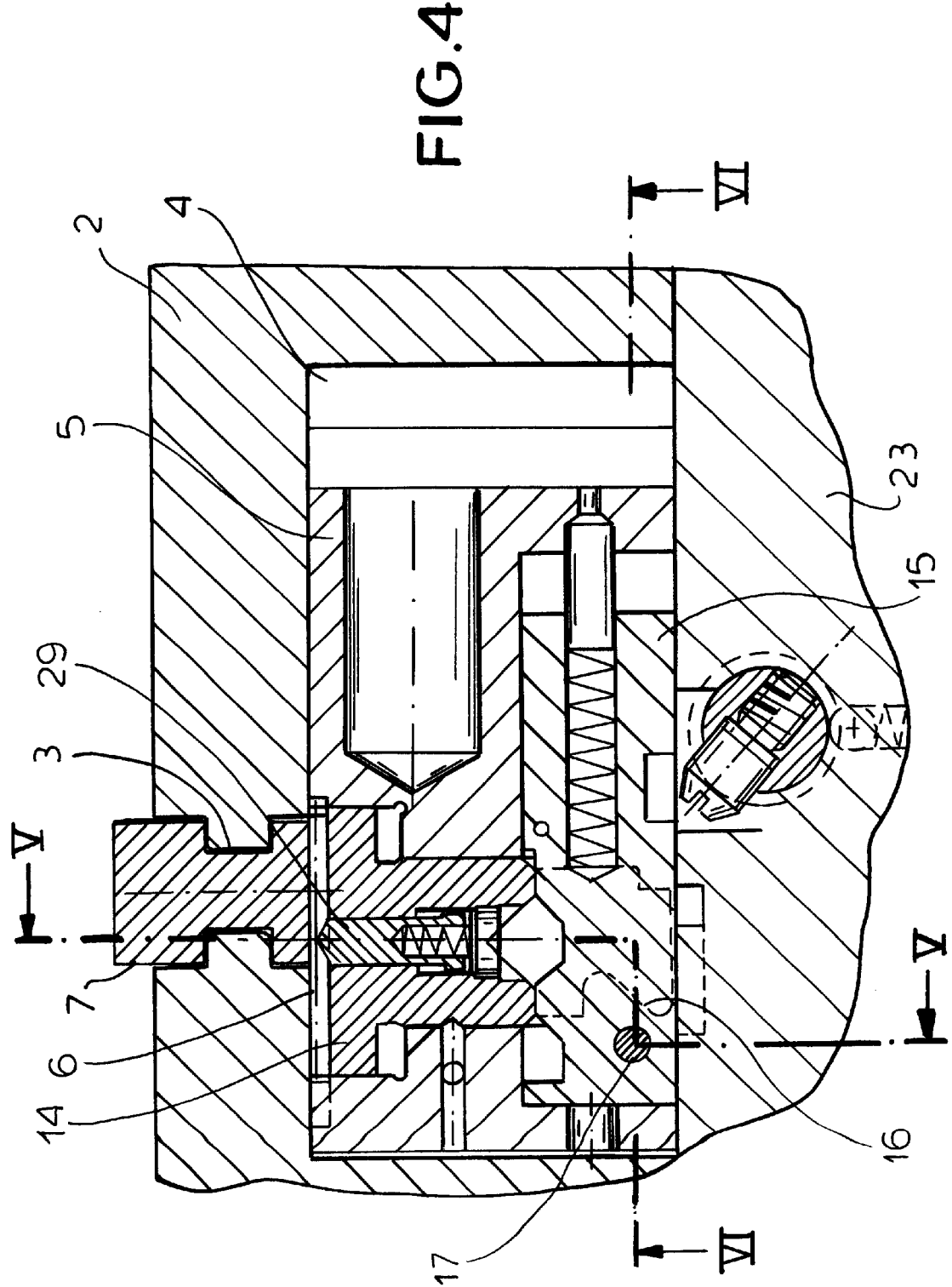

LATHE CHUCK WITH JAW-POSITION MONITOR

FIELD OF THE INVENTION

The present invention relates to a chuck. More particularly this invention concerns a three-jaw lathe chuck.

BACKGROUND OF THE INVENTION

A standard lathe chuck has a body rotatable about a body axis and formed with a plurality of angularly spaced, axially forwardly open, and radially extending jaw guides and with respective secantally extending rack guides crossing the jaw guides. Respective jaws are radially displaceable in the jaw guides between radial inner and outer end positions and have axially backwardly directed jaw teeth. Respective racks secantally displaceable in the rack guides each have axially forwardly directed teeth meshable with the respective jaw teeth. The jaw teeth typically extend perpendicular to the respective guide while the rack teeth are angled to the respective rack and parallel to the respective jaw teeth. An actuator jointly displaces the racks secantally in their guides so as to move the jaws radially in their guides.

It is standard to change the jaws to accommodate different workpieces and perform different turning operations. To this end the racks are slid so as to move the jaws to outer end positions in which the jaw teeth disengage from the rack teeth. Then the jaws can be pulled radially out of their guides and new jaws can be pushed radially in to replace them.

The problem is ensuring that a jaw is engaged with enough rack teeth. If only one tooth is engaged, the hold is weak and the tooth can shear off, sending the jaw flying and releasing the workpiece. It is fairly difficult to determine just how well a jaw is engaged when installing it.

OBJECTS OF THE INVENTION

It is therefore an object of the present invention to provide an improved lathe chuck.

Another object is the provision of such an improved lathe chuck which overcomes the above-given disadvantages, that is which allows the user to readily determine that a new jaw is engaged by a sufficient number of teeth.

SUMMARY OF THE INVENTION

A lathe chuck has according to the invention a chuck body rotatable about a body axis and formed with a plurality of angularly spaced, axially forwardly open, and radially extending jaw guides and with respective secantally extending rack guides crossing the jaw guides. Respective jaws are radially displaceable in the jaw guides between radial inner and outer end positions and have axially backwardly directed jaw teeth. Respective racks are secantally displaceable in the rack guides, and respective bolts in the racks each have axially forwardly directed teeth meshable with the respective jaw teeth and are each displaceable axially between a forward meshing position with the respective jaw and bolt teeth meshed and a rear out-of-mesh position with the respective jaw and bolt teeth out of mesh. A slide assembly angularly displaceable in the body has respective cam surfaces engageable with the bolts. The slide assembly is displaceable angularly between a holding position retaining the bolts in the respective meshing position and a freeing position allowing the bolts to move into the respective out-of-mesh positions. In accordance with the invention respective pins axially displaceable on the bolts have outer ends engageable with the respective jaws in both the meshing and out-of-mesh positions of the respective bolts and respective springs urge the pins axially outward toward the respective jaws.

Thus with this system, as a new jaw is being installed, its teeth will ratchet over the respective pin, producing a clicking sound. This makes it very easy for the person refitting the chuck to determine just how many teeth are engaged and, since the pin will naturally seat between adjacent jaw teeth, will ensure that when the bolts are advanced their teeth will mesh smoothly with the jaw teeth.

The slide assembly and bolts are provided according to the invention with interengaging cam formations for displacing the bolts into the out-of-mesh positions on displacement of the slide assembly into the freeing position. In addition the chuck body is formed with respective axially forwardly open seats receiving rear ends of the bolts in outer positions of the jaws and out-of-mesh positions of the bolts. Thus when the jaws have been moved into their outer positions, which correspond to end positions of the slides, and the bolts have been retracted to the out-of-mesh positions, the chuck is locked. As a result the actuator responsible for displacing the jaws will be held in an end position in which it normally actuates a switch that prevents the chuck from being rotated.

The cam surfaces include surface portions extending perpendicular to the axis and flatly engaging the respective bolts in the meshing positions and immediately thereadjacent angled surface portions. Thus as the slide assembly moves into the holding position from the freeing position the bolts will be smoothly cammed axially forward by the angled surface portions.

The slide assembly includes an angularly displaceable slide body formed with the cam surfaces and at least one rod rotatable in the chuck body and coupled to the slide body for angularly displacing same between the freeing and holding positions. This rod is accessible from outside the chuck so that the user need merely insert a tool into a recess at its outer end and rotate it to free the jaws from the respective bolts, which of course can only happen in outer end positions of the jaws.

The lathe chuck further has according to the invention a drive piston of a power actuator axially displaceable in the chuck body. The racks have angled formations engaged by the drive piston such that axial displacement of the drive piston displaces the racks in the rack guides. This ensures perfectly synchronous movement of the jaws.

The slide assembly can include a plurality of slides and the racks to this end are formed with guide slots slidably receiving the respective slides. Respective springs are braced between the slides and the racks for urging the slides into the holding positions. Alternately the slide assembly includes a ring forming all of the cam surfaces and set in a groove formed in the chuck body.

Respective locking pins according to the invention are axially displaceable in the bolts between forward positions projecting axially forward from the respective bolts and rear positions. The jaws force the locking pins into the rear positions when in mesh with the respective bolts. The slide assembly is formed with respective abutments angularly engageable by the locking pins only in the forward positions so that displacement of the slide assembly is inhibited in the rear positions of the locking pins. More particularly the locking pins have rear ends provided with enlarged heads and the slide assembly is formed with respective slots in which the heads can move angularly in the rear positions and with angularly limited pockets forming the abutments and in which the heads engage in the forward positions. Thus when the jaws are removed the chuck is locked. The locking pins and the pins that ratchet to monitor jaw position can be the same structure.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 2, 3, and 4 are sections taken along respective lines II—II, III—III, and IV—IV of FIG. 1;

SPECIFIC DESCRIPTION

Figure 1:
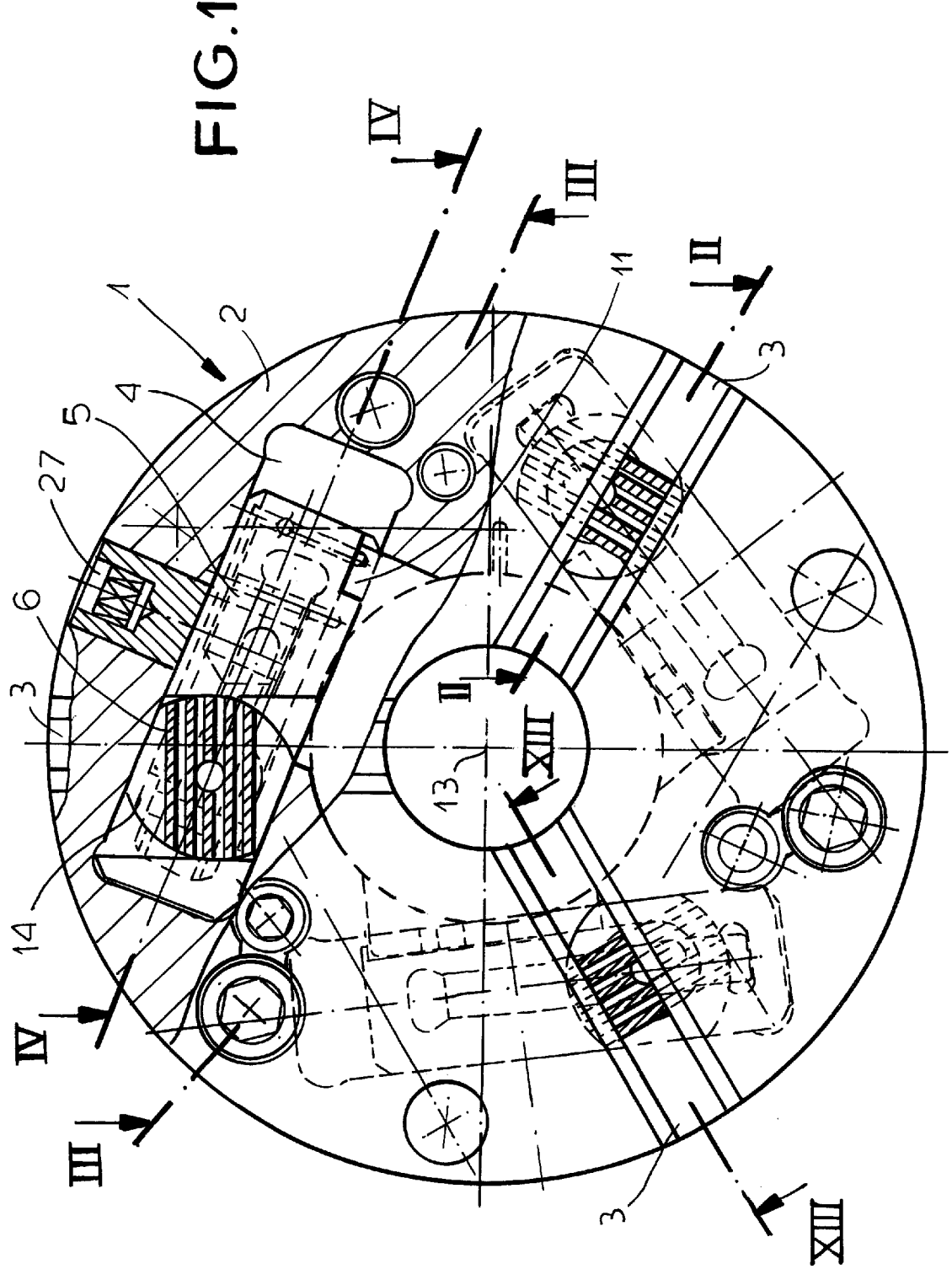
FIG. 1 is a partly sectional end view of a chuck according to the invention.

As seen in FIGS. 1 through 9 a chuck 1 according to the invention has a body formed of a front plate 2 and a back plate 23. The front plate 2 is formed relative to a center axis 13 with three angularly equispaced and radially extending guide grooves 3 and, crossing these grooves 3 but deeper in the plate 2, with three chordally or secantally extending guide grooves or passages 4 that each cross a respective one of the guide grooves 3 at an acute angle. Racks 5 displaceable in the grooves 4 have teeth 6 meshing with teeth 8 formed on jaws 7 displaceable in the grooves 3. The teeth 6 and 8 each extend along a tangent to a respective circle centered on this axis 13, that is perpendicular to the jaws 7 and guides 3, but the teeth 6 are angled relative to the respective racks 5 so that as the racks 5 move secantally along their guides 4 they will displace the respective jaws 7 radially. A drive piston 9 has an end fitting 10 formed with teeth 11 engaged in angled grooves 12 (FIGS. 2 and 3) in the sides of the racks 5 so that axial displacement of the guide piston 9 synchronously displaces the racks 5 and, therefore, the jaws 7. This is all generally standard.

Figure 2:
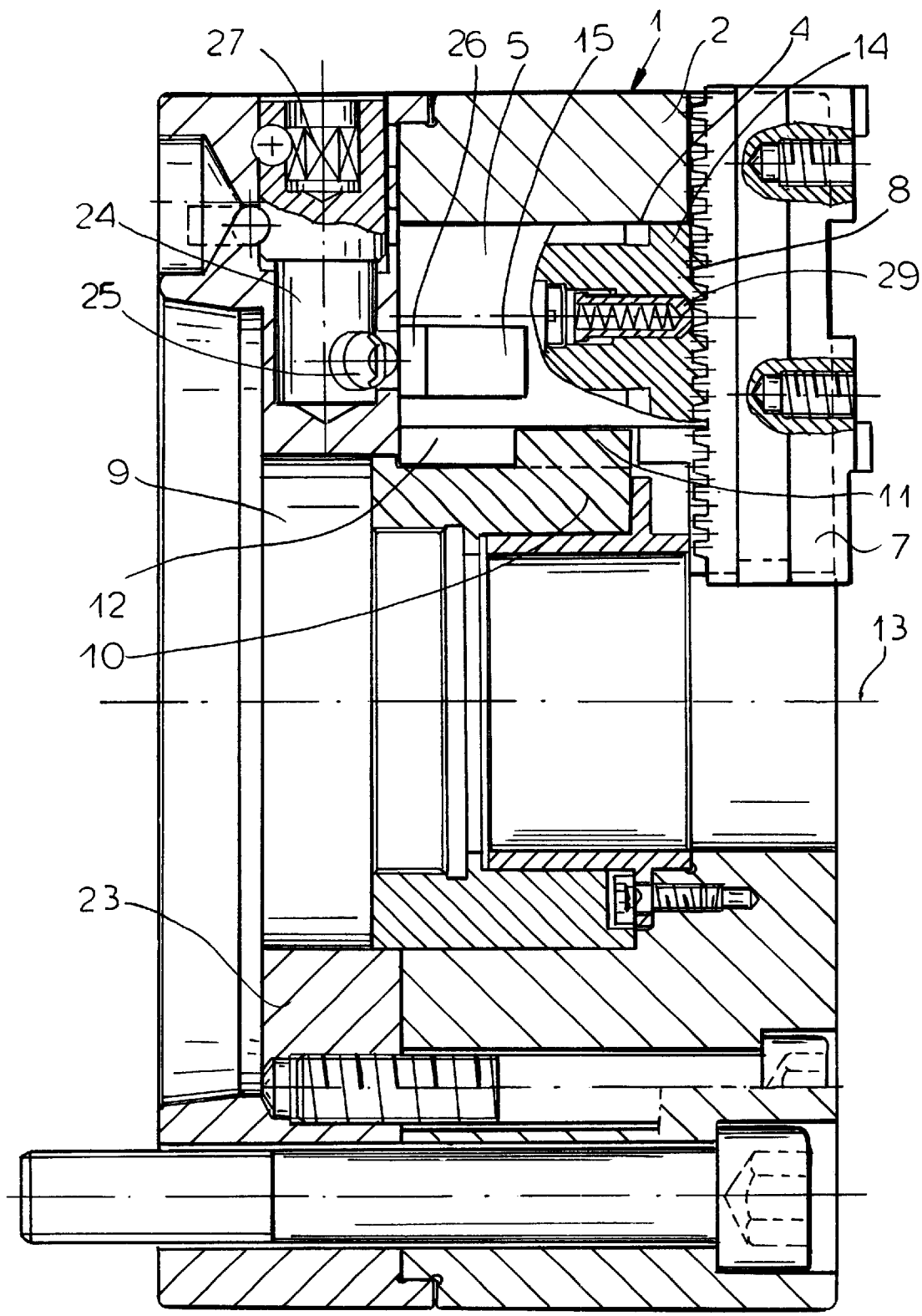
Figure 3:
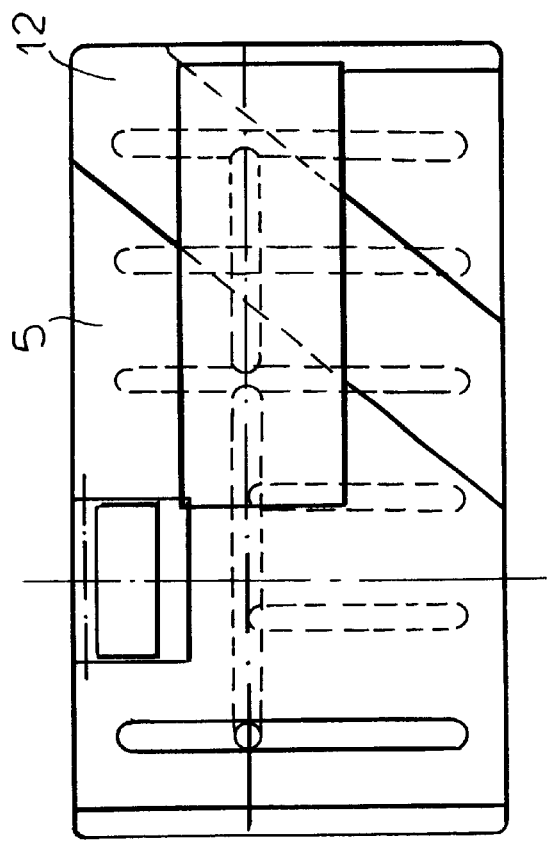
Figure 6:
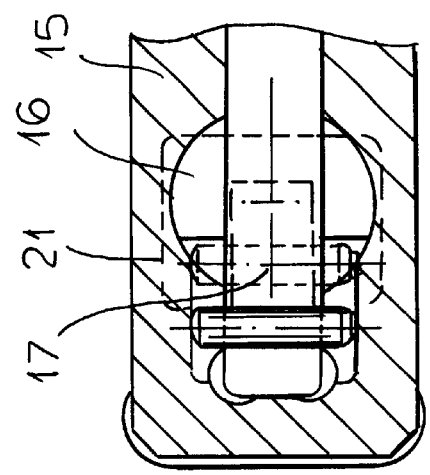
FIGS. 5 and 6 are sections taken along respective lines V—V and VI—VI of FIG. 4.
Figure 5:
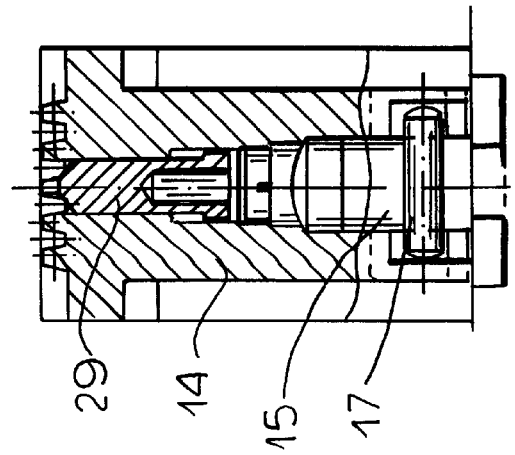
Figure 7:
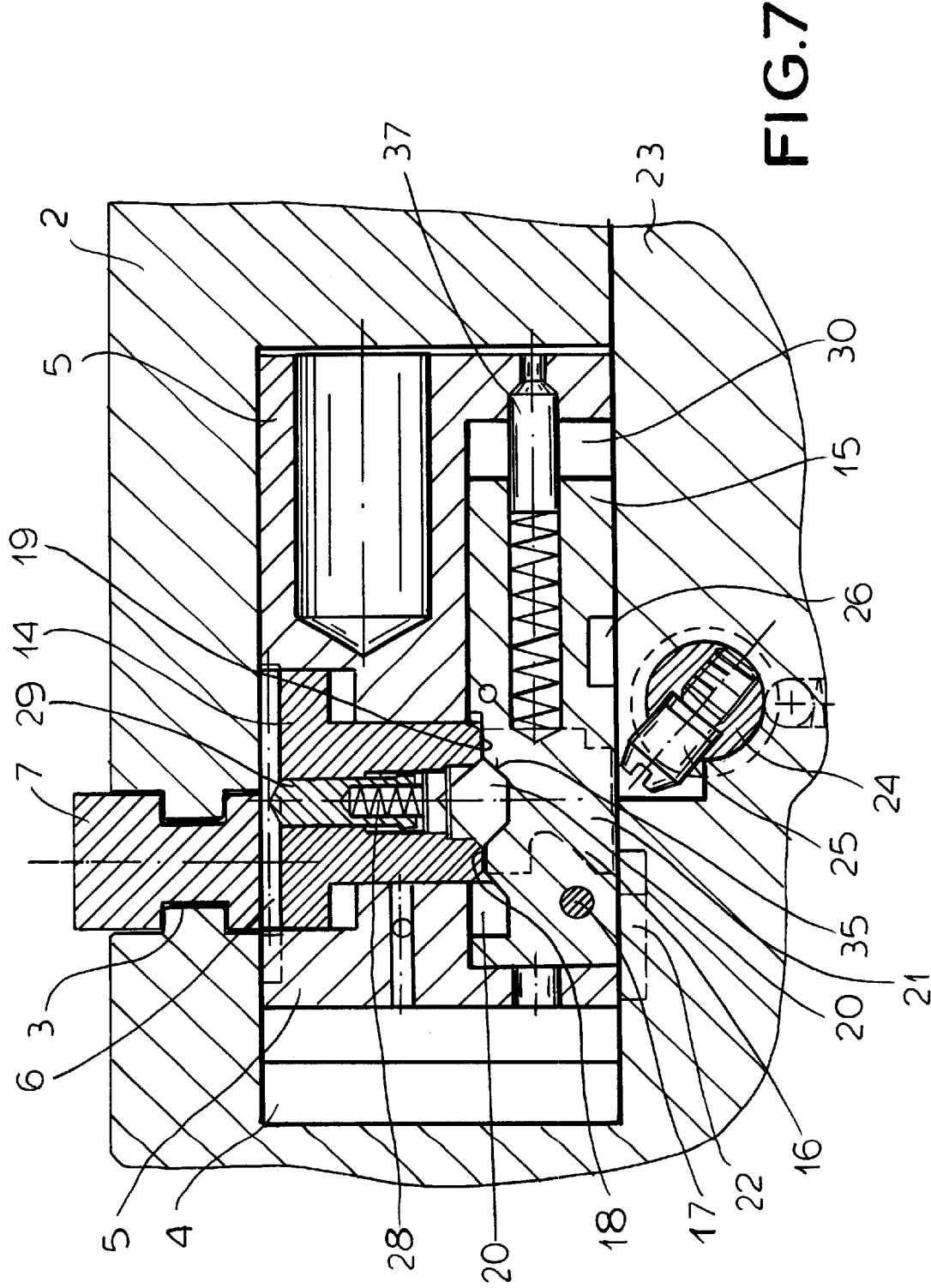
FIG. 7 is a view like FIG. 4 but with the illustrated jaw in an outer end position and the jaw-retaining bolt in a meshing position.
Figure 8:
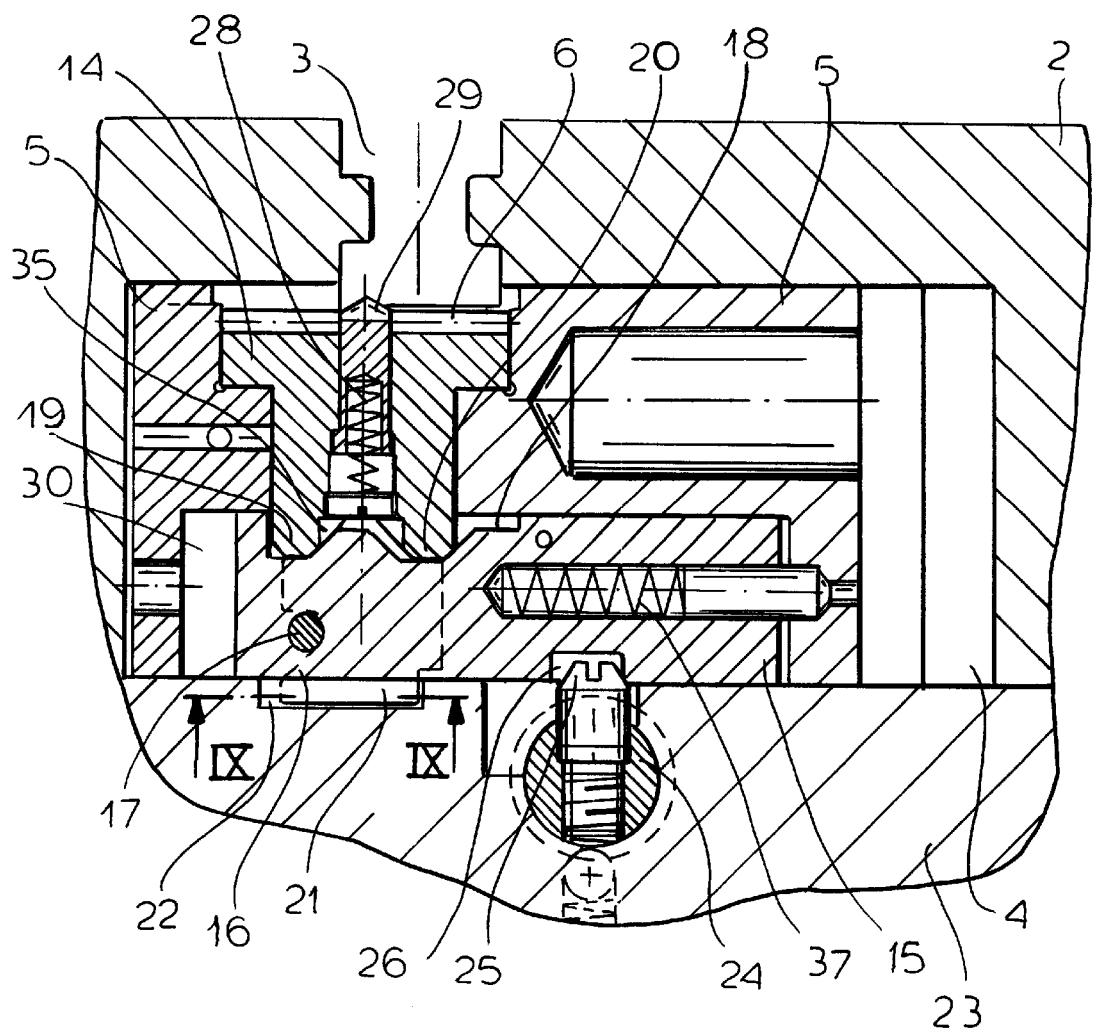
FIG. 8 is a view like FIG. 7 but with the jaw-retaining bolt in an out-of-mesh position.

The teeth 6 of each rack 5 are not formed directly on this rack 5 but instead on a bolt or element 14 movable axially in the rack 5 between a forward position shown in FIGS. 2 and 4 meshing with the teeth 8 of the jaw 7 and a rear position shown in FIGS. 8 out of mesh with the teeth 8. A retaining slide 15 is displaceable in a respective guide slot 30 of each rack 5 and has cam surfaces 18 which are engageable with inner end surfaces 19 of the respective bolt 14 so that, when the slide 15 is in a holding position as shown in FIG. 4, these axially outwardly directed surfaces 18 of the slide 15 axially engage the inwardly directed end surfaces 19 of the bolt 14 and prevent the bolt 14 from moving from its meshing position into its out-of-mesh position. The slide 15 is also formed with a pair of recesses 20 having angled flanks 35 and in which inner ends of the bolt 14 can engage in a freeing position when the surfaces 18 and 19 are not engaged together, that is when the bolt 14 is in the out-of-mesh position with the teeth 6 and 8 disengaged. A spring 37 urges the slide 15 into the freeing position. In addition the slide 15 carries a cam pin 17 whose ends are engageable with angled cam surfaces 16 of the bolt 14 so that, when as described below the slide is retracted to the freeing position this pin 17 pulls the bolt 14 down into the out-of-mesh position.

Figure 9:
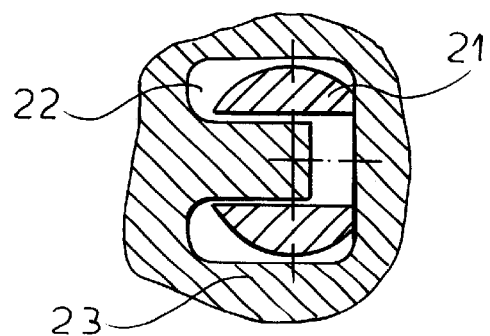
FIG. 9 is a section taken along line IX—IX of FIG. 8.
Figure 10:
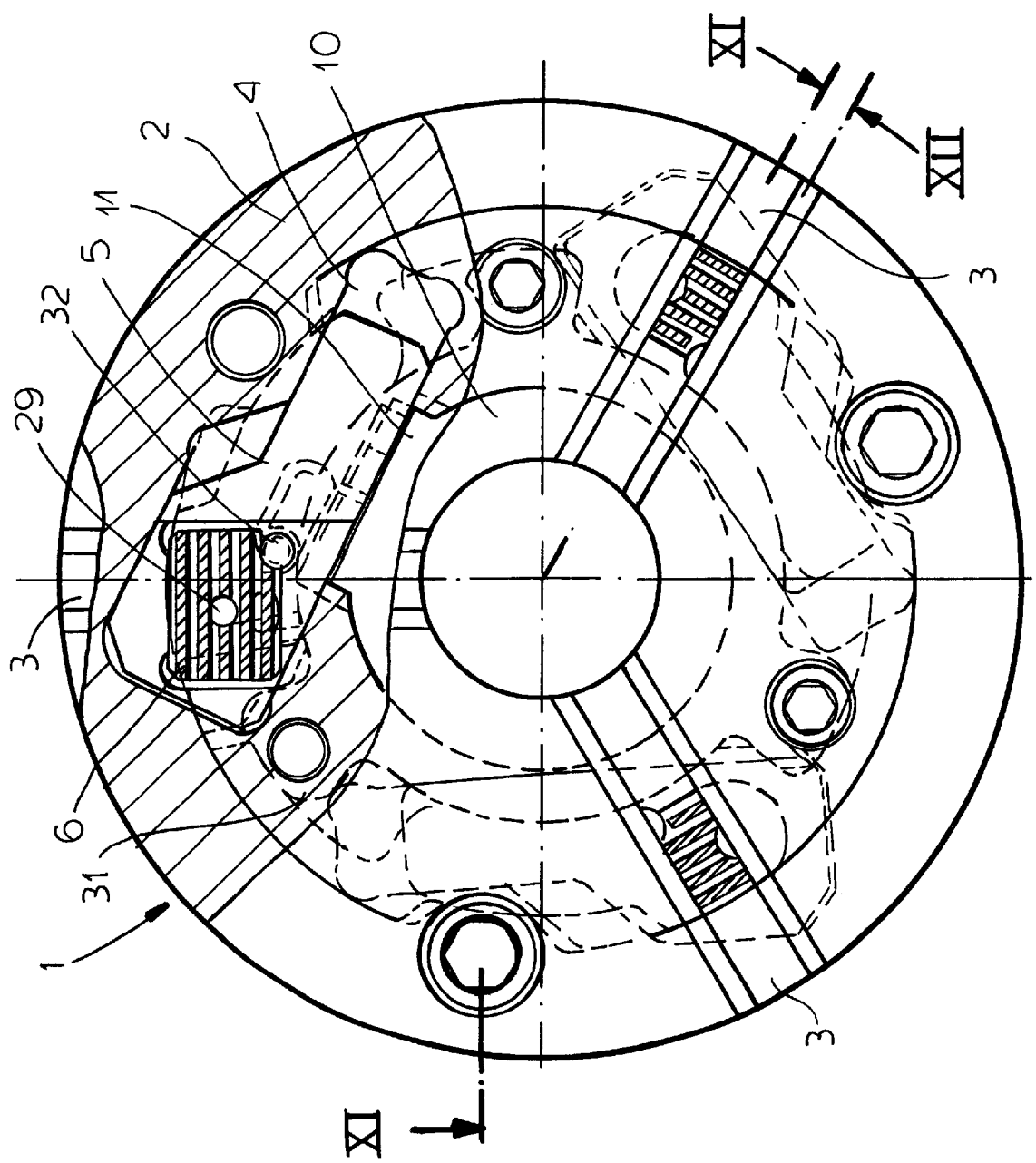
FIG. 10 is a view like FIG. 1 of another embodiment of the chuck in accordance with the invention.
Figure 11:
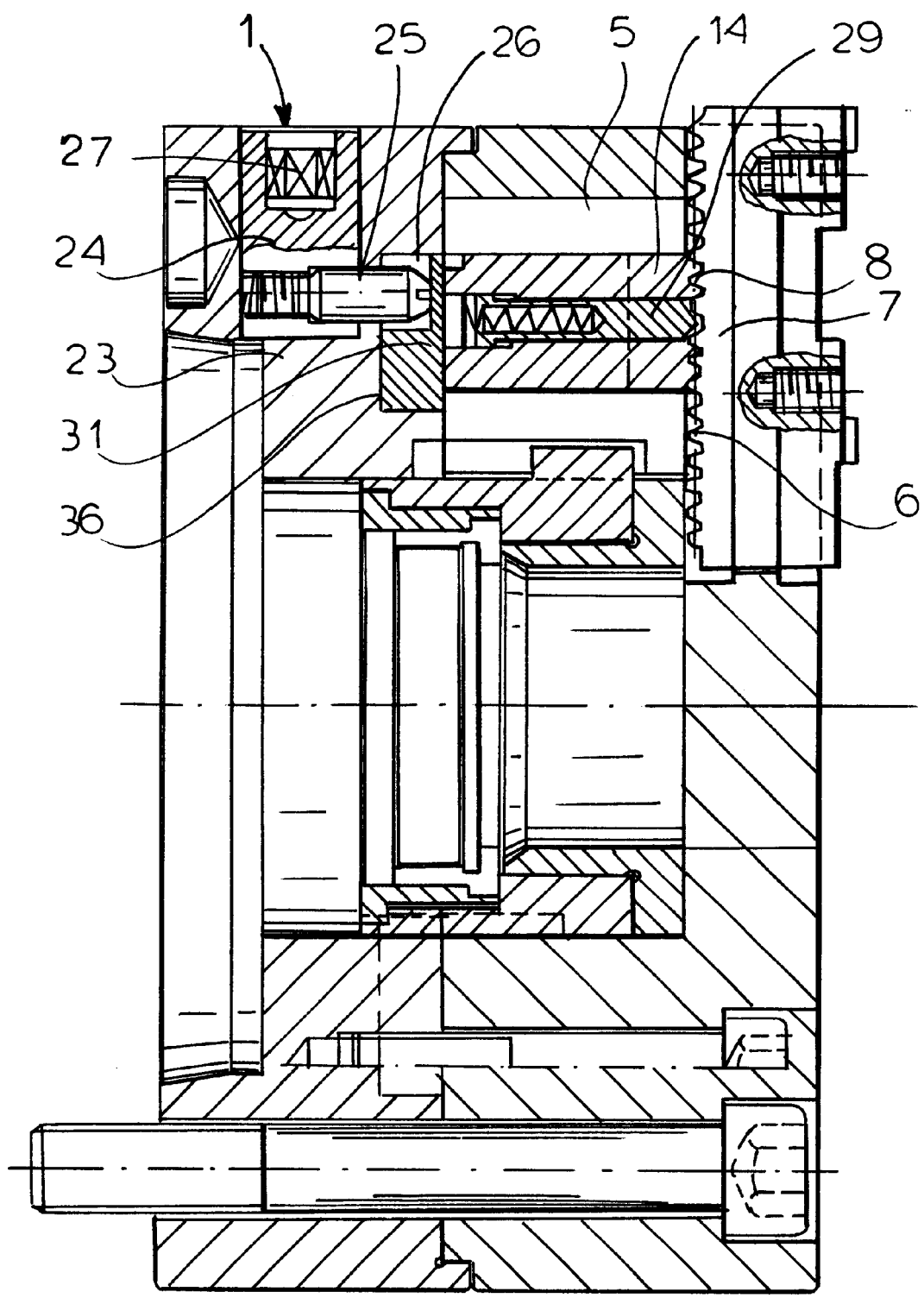
FIGS. 11 and 12 are sections taken along respective lines XI—XI and XII—XII of FIG. 10.
Figure 12:
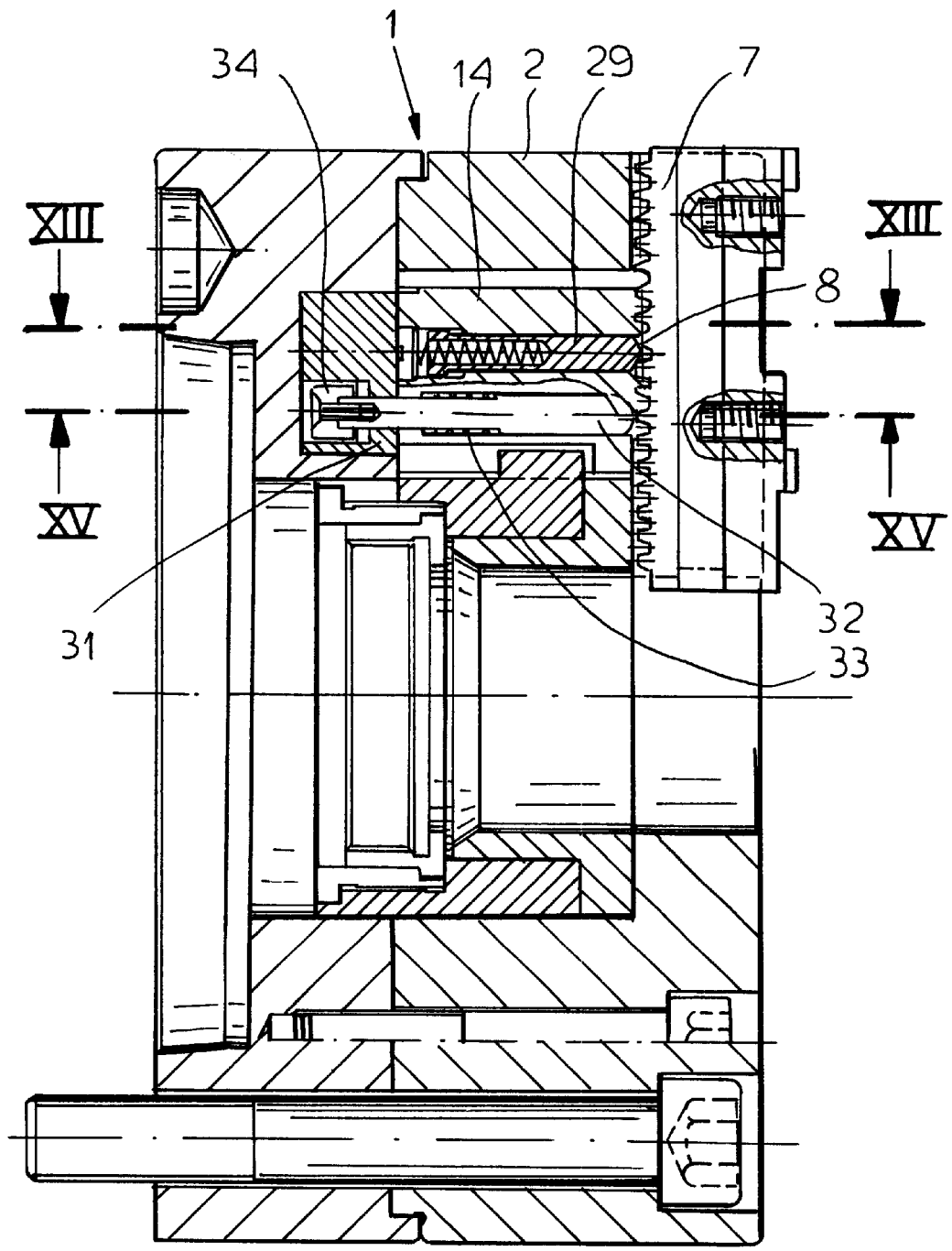
Figure 13:
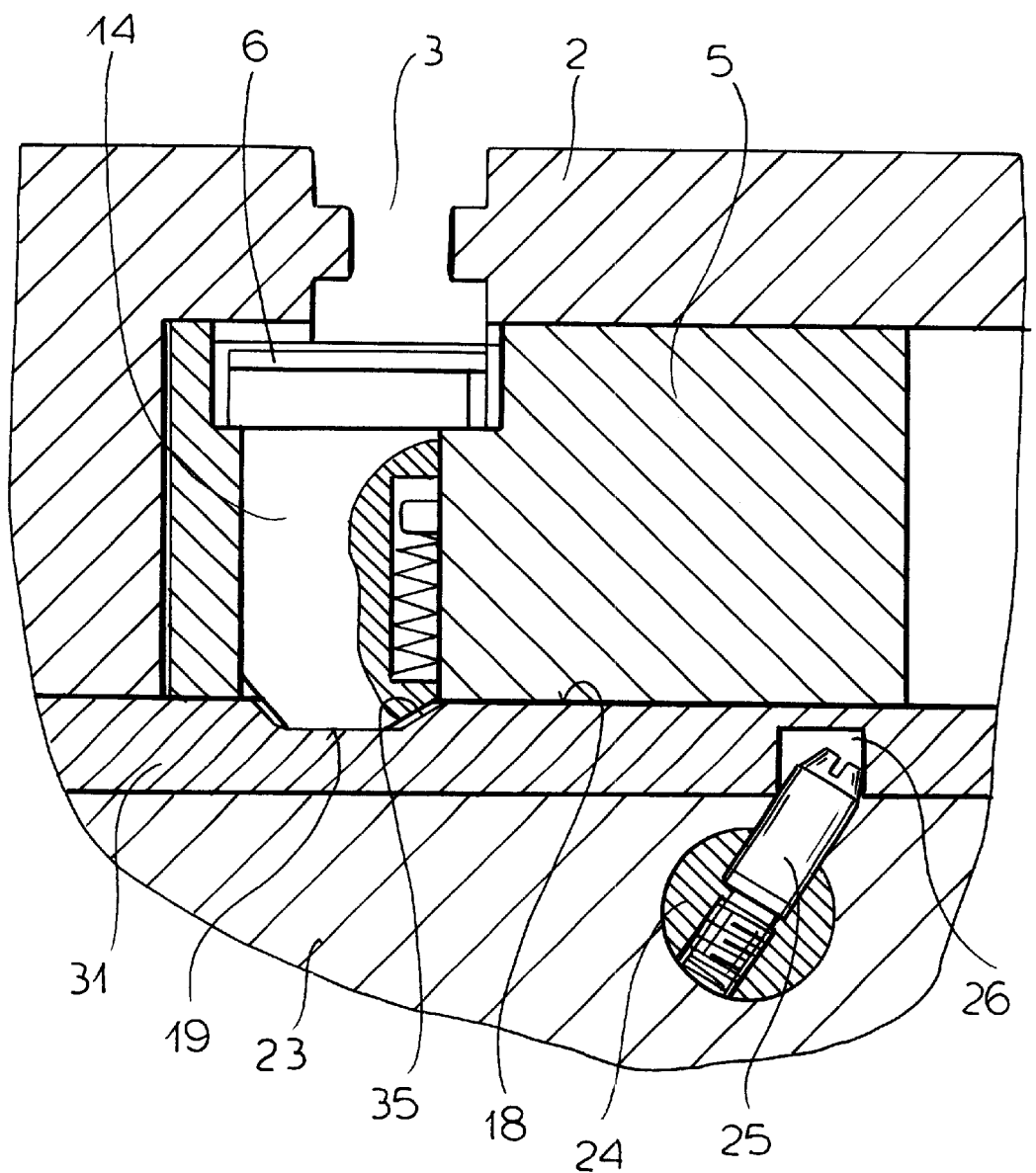
FIGS. 13 and 14 are sections taken along line XIII—XIII of FIG. 12.
Figure 14:
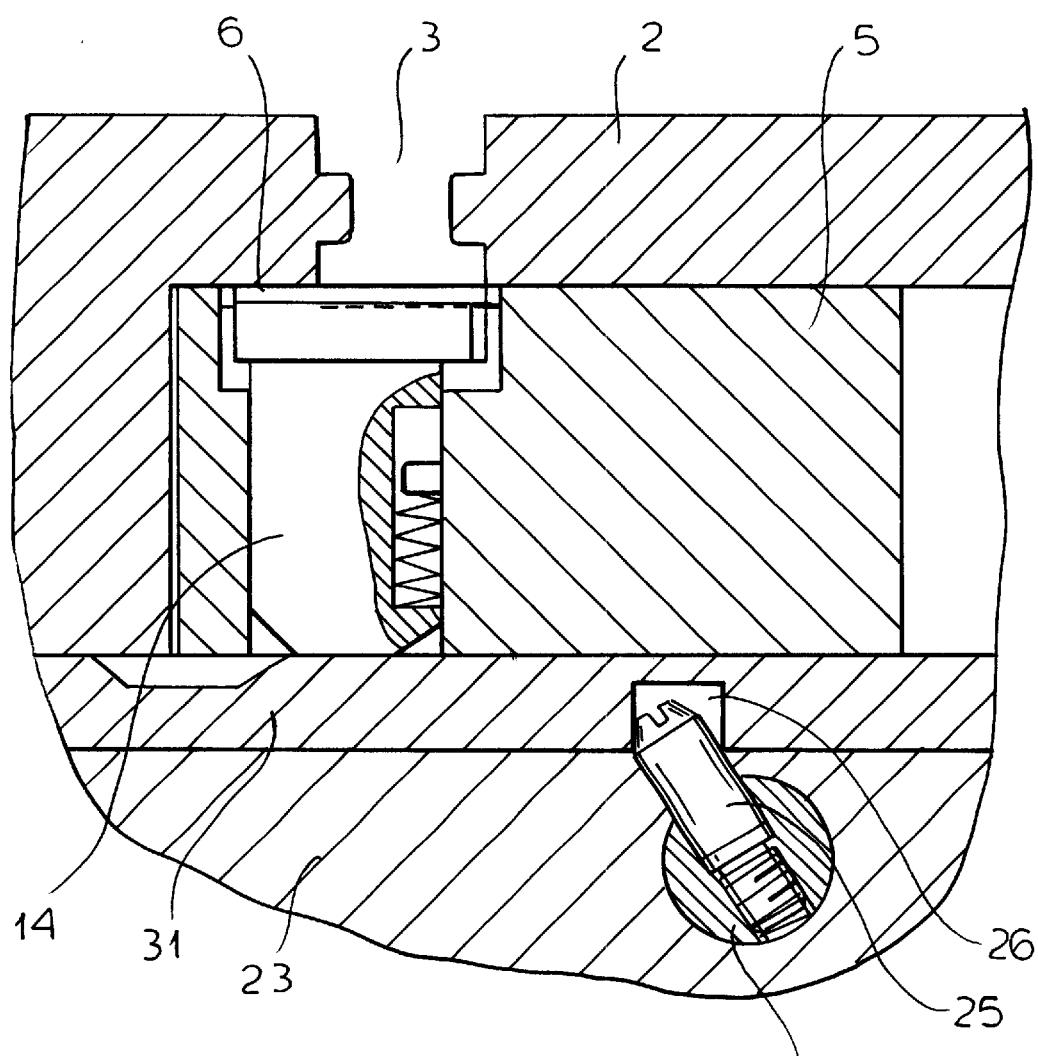
Figure 15:
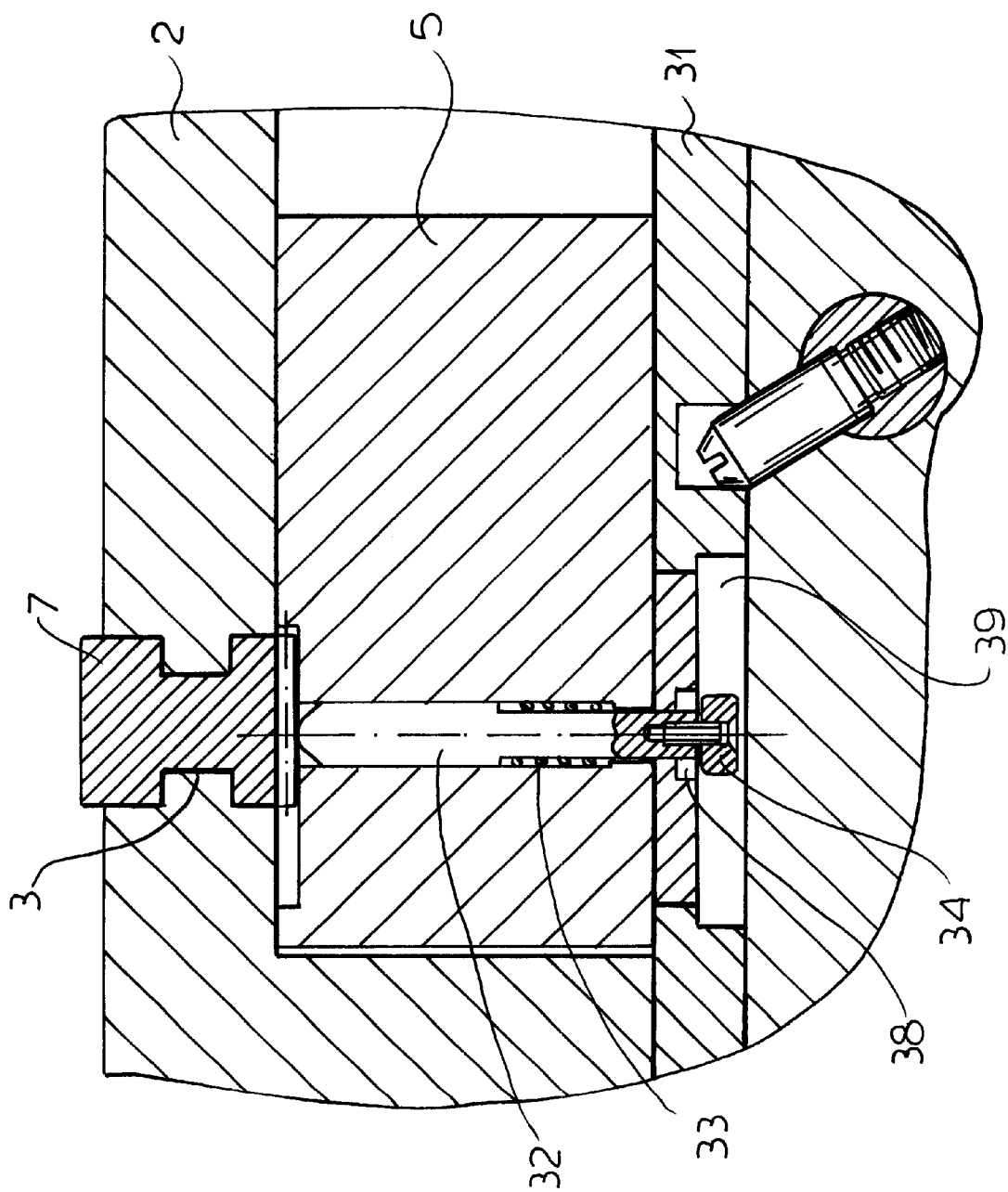
FIG. 15 is a section taken along line XV—XV of FIG. 12.

The inner end of the bolt 14 is forked as shown in FIG. 9 and has portions 21 engageable in recesses 22 of the body plate 23 so that when the bolt 14 is in the out-of-mesh position it cannot turn and the respective rack 5 cannot move in its guide slot 30. In addition the bolts 14 cannot fully retract into their out-of-mesh positions except when the respective jaws 7 are in their outer end positions, making it impossible for the jaws 7 to be removed except when in their outer end positions.

Each jaw 7 is associated with a rod 24 rotatable in the plate 23 about a radial axis and having an inner end provided with a pin 25 engageable in a cutout 26 formed in the slide 15. A tool such as a hex key can be inserted into a recess 27 at the radial outer end of this pin 25 to rotate it and thereby displace the slide 15 between its holding and freeing positions. Thus in order to remove a jaw 7, the chuck 1 is first operated to retract the jaws 7 to their outer end positions as shown in FIG. 4. Then the release pins 24 are each actuated so as to pull each of the slides 15 against the force of its spring 37 into the respective freeing position, moving the respective bolt 14 back from its meshing to its out-of-mesh position and allowing the jaw 7 to be pulled radially out of its guide slot 3. This action, as described above, forces the cam formations 16 and 17 into engagement with each other to positively retract the bolt 14 from its outer meshing position into its inner out-of-mesh position.

According to the invention each bolt 14 is provided with a monitor or sensor pin 29 urged axially outward by a respective spring 28 to a position engaging the teeth 8 of the respective jaw 7. The extent of outward travel of each such pin 29 is sufficient that, even in the out-of-mesh position of the respective bolt 14 as shown in FIG. 8, it is in the path of the teeth 8 of the respective jaw 7. Thus when a new jaw 7 is installed, the sensor pin 29 will engage the teeth 8 of this new jaw 7 as soon as it is inserted sufficiently to engage with the teeth 6 of the rack 5 and click as it passes over the endmost tooth 8. In this manner the user knows the jaw 7 has been inserted enough that when the respective retaining rod 24 is rotated back to move the respective slide 15 into the holding position, the teeth 6 and 8 will mesh. If the characteristic click of the pin 29 sliding over the teeth 8 is not heard, the user knows the jaw 7 has not been pushed into its slot 3 deeply enough.

FIGS. 10 through 14 show an arrangement where parts that are structurally or functionally identical to those of FIGS. 1 through 9 are assigned the same reference numerals. Here the three separate slides 15 are replaced by a single slide ring 31 set in a circular guide slot 36 formed in the back chuck plate 23 and forming all of the surfaces 18 and 35.

In addition each bolt 14 is provided with an axially throughgoing locking pin 32 urged axially outward by a respective compression spring 33 and having an inner end formed with a head 34 that rides in an angularly extending slot 39 of the ring 31 but that can engage in an outer position in an axially rearwardly open seat 38 of the ring 31. Thus when the respective jaw 7 is removed, this pin 32 will move outward and block angular movement of the ring 31 and of the rack 5. This also locks the piston 9 in its end position, which is normally detected by a position switch to ensure that the chuck 1 is not rotated.

I claim:

1. A lathe chuck comprising:
   a chuck body rotatable about a body axis and formed with a plurality of angularly spaced, axially forwardly open, and radially extending jaw guides and with respective secantally extending rack guides crossing the jaw guides;
   respective jaws radially displaceable in the jaw guides between radial inner and outer end positions and having axially backwardly directed jaw teeth;
   respective racks secantally displaceable in the rack guides;
   respective bolts in the racks each having axially forwardly directed teeth meshable with the respective jaw teeth and each displaceable axially between a forward meshing position with the respective jaw and bolt teeth meshed and a rear out-of-mesh position with the respective jaw and bolt teeth out of mesh;
   a slide assembly angularly displaceable in the body and having respective cam surfaces engageable with the bolts, the slide assembly being displaceable angularly between a holding position retaining the bolts in the respective meshing position and a freeing position allowing the bolts to move into the respective out-of-mesh positions;
   respective pins axially displaceable on the bolts and having outer ends engageable with the respective jaws in both the meshing and out-of-mesh positions of the respective bolts; and
   respective springs urging the pins axially outward toward the respective jaws.

2. The lathe chuck defined in claim 1 wherein the slide assembly and bolts are provided with means including interengaging cam formations for displacing the bolts into the out-of-mesh positions on displacement of the slide assembly into the freeing position.

3. The lathe chuck defined in claim 1 wherein the chuck body is formed with respective axially forwardly open seats receiving rear ends of the bolts in outer positions of the jaws and out-of-mesh positions of the bolts.

4. The lathe chuck defined in claim 1 wherein the cam surfaces include surface portions extending perpendicular to the axis and flatly engaging the respective bolts in the meshing positions and immediately thereadjacent angled surface portions.

5. The lathe chuck defined in claim 1 wherein the slide assembly includes
   an angularly displaceable slide body formed with the cam surfaces and
   at least one rod rotatable in the chuck body and coupled to the slide body for angularly displacing same between the freeing and holding positions.

6. The lathe chuck defined in claim 1, further comprising
   a drive piston axially displaceable in the chuck body, the racks having angled formations engaged by the drive piston such that axial displacement of the drive piston displaces the racks in the rack guides.

7. The lathe chuck defined in claim 1 wherein the slide assembly includes a plurality of slides and the racks are formed with guide slots slidably receiving the respective slides.

8. The lathe chuck defined in claim 1, further comprising
   respective spring means braced between the slides and the racks for urging the slides into the holding positions.

9. The lathe chuck defined in claim 1 wherein the slide assembly includes a ring forming all of the cam surfaces.

10. The lathe chuck defined in claim 9 wherein the chuck body is formed with a groove receiving the ring.

11. The lathe chuck defined in claim 1, further comprising
    respective locking pins axially displaceable in the bolts between forward positions projecting axially forward from the respective bolts and rear positions, the jaws forcing the locking pins into the rear positions when in mesh with the respective bolts, the slide assembly being formed with respective abutments angularly engageable by the locking pins only in the forward positions, whereby displacement of the slide assembly is inhibited in the rear positions of the locking pins.

12. The lathe chuck defined in claim 1 wherein the locking pins have rear ends provided with enlarged heads and the slide assembly is formed with respective slots in which the heads can move angularly in the rear positions and with angularly limited pockets forming the abutments and in which the heads engage in the forward positions.

* * * * *